United States Patent
Chatterjee et al.

(10) Patent No.: US 9,955,227 B2
(45) Date of Patent: Apr. 24, 2018

(54) SYSTEM AND METHOD FOR COMMUNICATING ALERTS THROUGH A SET-TOP BOX

(71) Applicant: CenturyLink Intellectual Property LLC, Denver, CO (US)

(72) Inventors: Koushik Chatterjee, Orlando, FL (US); Steven M. Casey, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 27 days.

(21) Appl. No.: 13/962,531

(22) Filed: Aug. 8, 2013

(65) Prior Publication Data

US 2014/0282705 A1 Sep. 18, 2014

Related U.S. Application Data (60) Provisional application No. 61/780,197, filed on Mar. 13, 2013.

(51) Int. Cl.
*H04N 21/488* (2011.01)
*H04N 21/61* (2011.01)
*H04N 21/485* (2011.01)

(52) U.S. Cl.
CPC ....... *H04N 21/4882* (2013.01); *H04N 21/485* (2013.01); *H04N 21/6175* (2013.01)

(58) Field of Classification Search
CPC .... H04N 21/236; H04N 21/258; H04N 21/25; H04N 21/442; H04N 21/45; H04N 21/4882; H04N 21/485; H04N 21/6175; H04N 21/44222; H04N 21/25891; H04N 21/472; H04N 21/47214; H04N 21/814

USPC .......................................................... 725/33
See application file for complete search history.

(56) References Cited

U.S. PATENT DOCUMENTS

| | | | |
|---|---|---|---|
| 5,831,664 | A | 11/1998 | Wharton et al. |
| 5,872,588 | A | 2/1999 | Aras et al. |
| 6,532,589 | B1 | 3/2003 | Proehl et al. |
| 6,684,240 | B1 | 1/2004 | Goddard |
| 6,810,526 | B1 | 10/2004 | Menard et al. |
| 7,478,414 | B1 | 1/2009 | Glusker et al. |
| 7,571,458 | B1 | 8/2009 | Eyal |
| 7,640,570 | B2 | 12/2009 | Wagner et al. |
| 7,643,564 | B2 | 1/2010 | Sheynman |

(Continued)

FOREIGN PATENT DOCUMENTS

EP  1650927 A2 *  4/2006

OTHER PUBLICATIONS

US 9,083,851, 07/2015, Goergen et al. (withdrawn)

(Continued)

*Primary Examiner* — Benjamin R Bruckart
*Assistant Examiner* — Tien M Nguyen
(74) *Attorney, Agent, or Firm* — Swanson & Bratschun, L.L.C.

(57) ABSTRACT

A system and method for distributing an alert to a set-top box. Media content is received for communication to one or more set-top boxes. Data is extracted from the media content. A determination is made whether the extracted data is associated with one or more alert profiles. The alert is generated in response to the extracted data being associated with the one or more alert profiles. The alert is distributed to one or more set-top boxes in response to generating the one or more alert profiles.

19 Claims, 4 Drawing Sheets

(56) References Cited

U.S. PATENT DOCUMENTS

| | | | |
|---|---|---|---|
| 7,870,279 B2* | 1/2011 | Chuang et al. | 709/231 |
| 7,882,528 B1 | 2/2011 | Taylor et al. | |
| 8,253,558 B2 | 8/2012 | Emerson et al. | |
| 8,260,363 B2 | 9/2012 | Roberts et al. | |
| 8,286,215 B2 | 10/2012 | Daniels | |
| 8,312,500 B2 | 11/2012 | Emerson et al. | |
| 8,316,399 B1 | 11/2012 | Nush | |
| 8,467,275 B2 | 6/2013 | Emerson et al. | |
| 8,478,598 B2 | 7/2013 | Burckart et al. | |
| 8,584,189 B2 | 11/2013 | Emerson et al. | |
| 8,627,377 B2 | 1/2014 | LaFreniere et al. | |
| 8,627,399 B2 | 1/2014 | White et al. | |
| 8,731,620 B2 | 5/2014 | Roberts et al. | |
| 8,756,646 B2 | 6/2014 | LaFreniere et al. | |
| 8,789,113 B2 | 7/2014 | Goergen et al. | |
| 8,856,855 B2 | 10/2014 | Goergen et al. | |
| 9,106,976 B2 | 8/2015 | Emerson et al. | |
| 9,167,206 B2 | 10/2015 | Goergen et al. | |
| 9,215,419 B2 | 12/2015 | Rondeau et al. | |
| 9,300,993 B2 | 3/2016 | Goergen et al. | |
| 9,460,611 B2 | 10/2016 | Emerson et al. | |
| 9,866,917 B2 | 1/2018 | Goergen et al. | |
| 9,872,078 B2 | 1/2018 | Goergen et al. | |
| 2001/0021994 A1 | 9/2001 | Nash | |
| 2002/0054062 A1 | 5/2002 | Gerba et al. | |
| 2002/0083468 A1* | 6/2002 | Dudkiewicz | 725/133 |
| 2002/0100044 A1 | 7/2002 | Daniels | |
| 2002/0124252 A1* | 9/2002 | Schaefer et al. | 725/33 |
| 2002/0129368 A1 | 9/2002 | Schlack et al. | |
| 2002/0147986 A1 | 10/2002 | Michael et al. | |
| 2002/0178451 A1 | 11/2002 | Ficco | |
| 2002/0184631 A1 | 12/2002 | Cezeaux et al. | |
| 2002/0188944 A1 | 12/2002 | Noble | |
| 2002/0188949 A1 | 12/2002 | Wang et al. | |
| 2002/0188959 A1 | 12/2002 | Piotrowski | |
| 2003/0005448 A1 | 1/2003 | Axelsson et al. | |
| 2003/0018977 A1 | 1/2003 | McKenna | |
| 2003/0066069 A1 | 4/2003 | Mankovich | |
| 2003/0128114 A1 | 7/2003 | Quigley | |
| 2003/0128820 A1 | 7/2003 | Hirschberg et al. | |
| 2003/0194966 A1 | 10/2003 | Fellenstein et al. | |
| 2003/0208777 A1 | 11/2003 | Danker et al. | |
| 2004/0019807 A1 | 1/2004 | Freund | |
| 2004/0049785 A1* | 3/2004 | Grzeczkowski | H04N 7/17327 725/46 |
| 2004/0073915 A1 | 4/2004 | Dureau | |
| 2004/0203651 A1 | 10/2004 | Qu et al. | |
| 2005/0091683 A1 | 4/2005 | Sheynman et al. | |
| 2005/0149987 A1 | 7/2005 | Boccon-Gibod et al. | |
| 2005/0204388 A1 | 9/2005 | Knudson et al. | |
| 2005/0207542 A1 | 9/2005 | Carroll et al. | |
| 2006/0020993 A1 | 1/2006 | Hannum et al. | |
| 2006/0087428 A1 | 4/2006 | Wolfe et al. | |
| 2006/0107297 A1 | 5/2006 | Toyama et al. | |
| 2006/0123053 A1 | 6/2006 | Scannell, Jr. | |
| 2006/0127038 A1 | 6/2006 | Kwon | |
| 2006/0184989 A1 | 8/2006 | Slothouber | |
| 2006/0212894 A1 | 9/2006 | Knudson et al. | |
| 2006/0253886 A1 | 11/2006 | Khurana et al. | |
| 2006/0294564 A1 | 12/2006 | Guillorit | |
| 2007/0079345 A1 | 4/2007 | McEnroe | |
| 2007/0079353 A1 | 4/2007 | Boortz | |
| 2007/0104456 A1 | 5/2007 | Craner | |
| 2007/0121651 A1 | 5/2007 | Casey et al. | |
| 2007/0150273 A1 | 6/2007 | Yamamoto et al. | |
| 2007/0154163 A1 | 7/2007 | Cordray | |
| 2007/0204288 A1 | 8/2007 | Candelore | |
| 2007/0220554 A1 | 9/2007 | Barton et al. | |
| 2007/0280445 A1 | 12/2007 | Shkedi | |
| 2007/0280446 A1 | 12/2007 | Hsieh et al. | |
| 2007/0287498 A1 | 12/2007 | Wang et al. | |
| 2007/0294180 A1 | 12/2007 | Bucher et al. | |
| 2007/0300269 A1 | 12/2007 | Roberts et al. | |
| 2008/0026694 A1 | 1/2008 | Ramanathan et al. | |
| 2008/0059992 A1 | 3/2008 | Amidon et al. | |
| 2008/0107244 A1 | 5/2008 | Setzer et al. | |
| 2008/0115164 A1 | 5/2008 | Kiiskinen | |
| 2008/0134043 A1* | 6/2008 | Georgis | G06F 17/30035 715/733 |
| 2008/0228733 A1 | 9/2008 | Davis et al. | |
| 2008/0282290 A1 | 11/2008 | Malik et al. | |
| 2008/0301732 A1 | 12/2008 | Archer et al. | |
| 2009/0052870 A1 | 2/2009 | Marsh et al. | |
| 2009/0069038 A1 | 3/2009 | Olague et al. | |
| 2009/0089844 A1 | 4/2009 | Beyabani | |
| 2009/0133069 A1 | 5/2009 | Conness et al. | |
| 2009/0133070 A1 | 5/2009 | Hamano et al. | |
| 2009/0150925 A1* | 6/2009 | Henderson | 725/34 |
| 2009/0158325 A1 | 6/2009 | Johnson | |
| 2009/0158382 A1 | 6/2009 | Shaffer et al. | |
| 2009/0164559 A1 | 6/2009 | Johnson et al. | |
| 2009/0217324 A1* | 8/2009 | Massimi | 725/46 |
| 2009/0217332 A1 | 8/2009 | Hindle et al. | |
| 2009/0228929 A1 | 9/2009 | Cass | |
| 2009/0249387 A1 | 10/2009 | Magdy et al. | |
| 2009/0249451 A1 | 10/2009 | Su et al. | |
| 2009/0265737 A1 | 10/2009 | Issa et al. | |
| 2009/0276224 A1 | 11/2009 | Medina et al. | |
| 2009/0293079 A1 | 11/2009 | McKee et al. | |
| 2009/0300695 A1 | 12/2009 | White et al. | |
| 2010/0058395 A1* | 3/2010 | Goergen | H04N 7/17318 725/58 |
| 2010/0058415 A1 | 3/2010 | Goergen et al. | |
| 2010/0058416 A1 | 3/2010 | LaFreniere et al. | |
| 2010/0058417 A1* | 3/2010 | Rondeau | G06F 17/30017 725/110 |
| 2010/0064325 A1 | 3/2010 | Fishman et al. | |
| 2010/0125884 A1 | 5/2010 | Howcroft | |
| 2010/0149302 A1 | 6/2010 | Malik | |
| 2010/0169944 A1 | 7/2010 | Rondeau et al. | |
| 2010/0186038 A1 | 7/2010 | Thomas et al. | |
| 2010/0251325 A1 | 9/2010 | Gupta | |
| 2010/0261466 A1 | 10/2010 | Chang et al. | |
| 2011/0126251 A1* | 5/2011 | LaFreniere et al. | 725/110 |
| 2011/0126257 A1* | 5/2011 | Goergen et al. | 725/132 |
| 2011/0131604 A1 | 6/2011 | Van Hoff et al. | |
| 2011/0270952 A1 | 11/2011 | Ray et al. | |
| 2012/0018510 A1 | 1/2012 | Gardner | |
| 2012/0223134 A1 | 9/2012 | Smith et al. | |
| 2012/0223135 A1 | 9/2012 | Meek et al. | |
| 2012/0233638 A1 | 9/2012 | Slaney et al. | |
| 2012/0317599 A1 | 12/2012 | Emerson et al. | |
| 2012/0324003 A1 | 12/2012 | Armstrong et al. | |
| 2013/0031590 A1 | 1/2013 | Ivanov et al. | |
| 2013/0074109 A1* | 3/2013 | Skelton | H04H 20/00 725/14 |
| 2013/0241726 A1 | 9/2013 | Hunter et al. | |
| 2013/0305275 A1 | 11/2013 | Emerson et al. | |
| 2014/0053190 A1 | 2/2014 | Sirpal | |
| 2014/0066003 A1 | 3/2014 | Emerson et al. | |
| 2014/0074621 A1 | 3/2014 | Chai et al. | |
| 2014/0130093 A1 | 5/2014 | Goergen et al. | |
| 2014/0259081 A1 | 9/2014 | Chatterjee | |
| 2015/0296261 A1 | 10/2015 | Emerson et al. | |
| 2016/0029062 A1 | 1/2016 | Rondeau et al. | |
| 2016/0165317 A1 | 6/2016 | Goergen et al. | |

OTHER PUBLICATIONS

U.S. Appl. No. 12/201,249; Notice of Allowance dated Mar. 14, 2014; 31 pages.

U.S. Appl. No. 12/201,313; NonFinal Office Action dated Mar. 26, 2014; 10 pages.

U.S. Appl. No. 12/201,313; Final Office Action dated Oct. 23, 2014; 11 pages.

U.S. Appl. No. 12/201,313; Final Office Action dated Feb. 27, 2015; 11 pages.

U.S. Appl. No. 14/152,696; Notice of Publication dated May 8, 2014; 1 page.

U.S. Appl. No. 12/201,273; NonFinal Office Action dated Apr. 10, 2014; 35 pages.

U.S. Appl. No. 12/201,273; Final Office Action dated Oct. 27, 2014; 38 pages.

(56) References Cited

OTHER PUBLICATIONS

U.S. Appl. No. 12/201,273; Notice of Allowance dated Mar. 16, 2015; 28 pages.
U.S. Appl. No. 12/201,436; Final Office Action dated Apr. 25, 2014; 30 pages.
U.S. Appl. No. 13/750,537; Notice of Allowance dated Jan. 10, 2014; 11 pages.
U.S. Appl. No. 12/347,414; Final Office Action dated Feb. 3, 2014; 16 pages.
U.S. Appl. No. 12/347,414; NonFinal Office Action dated Sep. 11, 2014; 17 pages.
U.S. Appl. No. 12/347,414; Final Office Action dated Feb. 3, 2015; 17 pages.
U.S. Appl. No. 13/567,367; NonFinal Office Action dated Jan. 30, 2014; 17 pages.
U.S. Appl. No. 13/567,367; Final Office Action dated Jul. 23, 2014; 14 pages.
U.S. Appl. No. 12/625,744; Notice of Allowance dated Feb. 5, 2014; 26 pages.
U.S. Appl. No. 12/625,762; Notice of Allowance dated Jun. 3, 2014; 18 pages.
U.S. Appl. No. 13/787,371; NonFinal Office Action dated Apr. 9, 2014; 30 pages.
U.S. Appl. No. 13/787,371; Final Office Action dated Aug. 22, 2014; 32 pages.
U.S. Appl. No. 13/787,371; Notice of Publication dated Sep. 11, 2014; 1 page.
U.S. Appl. No. 13/787,371; NonFinal Office Action dated Mar. 5, 2015; 40 pages.
U.S. Appl. No. 14/152,696; NonFinal Office Action dated Aug. 21, 2015; 26 pages.
U.S. Appl. No. 12/201,313; NonFinal Office Action dated Jul. 1, 2015; 19 pages.
U.S. Appl. No. 12/347,414; Notice of Allowance dated Jul. 7, 2015; 20 pages.
Parchomovsky, Gideon et al., "Fair Use Harbors"; 93 Va. L. Rev. 1483 (2007); 4 pages.
U.S. Appl. No. 13/910,706; Notice of Allowance dated Mar. 26, 2015; 30 pages.
U.S. Appl. No. 13/567,367; NonFinal Office Action dated Jun. 10, 2015; 21 pages.
U.S. Appl. No. 13/787,371; Final Office Action dated Jul. 30, 2015; 50 pages.
U.S. Appl. No. 12/201,313; Notice of Allowance dated Nov. 10, 2015; 13 pages.
U.S. Appl. No. 13/567,367; NonFinal Office Action dated Dec. 16, 2015; 17 pages.
U.S. Appl. No. 13/787,371; NonFinal Office Action dated Nov. 20, 2015; 50 pages.
U.S. Appl. No. 14/152,696; Final Office Action dated Jan. 21, 2016; 23 pages.
U.S. Appl. No. 14/152,696; NonFinal Office Action dated Jul. 1, 2016; 50 pages.
U.S. Appl. No. 13/567,367; Notice of Allowance dated Jun. 10, 2016; 13 pages.
U.S. Appl. No. 13/787,371; Final Office Action dated Apr. 5, 2016; 48 pages.
U.S. Appl. No. 14/747,843; NonFinal Office Action dated Apr. 6, 2016; 30 pages.
U.S. Appl. No. 14/878,226; NonFinal Office Action dated Jun. 15, 2016; 22 pages.
U.S. Appl. No. 14/747,843; Final Office Action dated Jul. 14, 2016; 34 pages.
U.S. Appl. No. 14/152,696; Final Office Action dated Oct. 6, 2016; 51 pages.
U.S. Appl. No. 13/787,371; NonFinal Office Action dated Jul. 28, 2016; 48 pages.
U.S. Appl. No. 15/040,865; NonFinal Office Action dated Oct. 6, 2016; 51 pages.
U.S. Appl. No. 13/787,371; Final Office Action dated Jan. 30, 2017; 49 pages.
U.S. Appl. No. 14/747,843; NonFinal Office Action dated Dec. 27, 2016; 26 pages.
U.S. Appl. No. 14/878,226; Final Office Action dated Nov. 30, 2016; 13 pages.
U.S. Appl. No. 14/878,226; NonFinal Office Action dated Mar. 22, 2017; 13 pages.
U.S. Appl. No. 15/040,865; Final Office Action dated Apr. 6, 2017; 30 pages.
U.S. Appl. No. 14/878,226; Final Office Action dated Aug. 29, 2017; 14 pages.
U.S. Appl. No. 15/040,865; Notice of Allowance dated Oct. 2, 2017; 37 pages.
U.S. Appl. No. 14/747,843; Non Final Office Action dated Oct. 18, 2017; 43 pages.
U.S. Appl. No. 12/201,273; Notice of Allowance dated Oct. 18, 2017, 25 pages.
U.S. Appl. No. 14/152,696; NonFinal Office Action dated May 1, 2017; 27 pages.
U.S. Appl. No. 13/787,371; NonFinal Office Action dated Jul. 11, 2017; 55 pages.
U.S. Appl. No. 14/747,843; Final Office Action dated Jun. 14, 2017; 40 pages.

* cited by examiner

SYSTEM AND METHOD FOR COMMUNICATING ALERTS THROUGH A SET-TOP BOX

CROSS REFERENCE TO RELATED APPLICATIONS

This application claims priority to U.S. Provisional Patent Application Ser. No. 61/780,197 filed on Mar. 13, 2013 entitled SYSTEM AND METHOD FOR COMMUNICATING ALERTS THROUGH A SET-TOP BOX the entire teachings of which are incorporated herein.

BACKGROUND

The use of and development of communications has grown nearly exponentially in recent years. The growth is fueled by larger networks with more reliable protocols and better communications hardware available to both service providers and consumers. In particular, many users receive satellite, cable, Internet Protocol television (IPTV), and other media services for display on one or more televisions within a home, business, or organization.

Many users have one or more set-top boxes, digital video recorders (DVR), personal video recorders (PVR), media devices, streaming devices, or home network devices in their home, business, or organization. In many cases, the functionality of these network devices may be limited to very narrow applications. Users have come to expect services that are more intuitive and integrated with their day-to-day lives. As a result, additional features and services have not kept pace with user expectations.

SUMMARY

One embodiment provides a system and method for distributing an alert to a set-top box. Media content is received for communication to one or more set-top boxes. Data is extracted from the media content. A determination is made whether the extracted data is associated with one or more alert profiles. The alert is generated in response to the extracted data being associated with the one or more alert profiles. The alert is distributed to one or more set-top boxes in response to generating the one or more alert profiles.

Another embodiment provides a set-top box. The set-top box may include an interface for communication with a communications network. The set-top box may also include output ports for communicating media content to one or more displays. The set-top box may also include logic configured to receive alerts associated with extracted data received by the communications network, and display the alerts to the one or more displays. The extracted data may be associated with one or more alert profiles associated with the set-top box. The set-top box may also include a memory configured to store one or more alert profiles for one or more users.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system and method for communicating alerts through a set-top box. In one embodiment, the set-top box is an electronic device configured to process an incoming media signal or communication for display by a television, monitor, projector or other similar device. The content may include data, files, information, instructions, video, music, advertisements, websites, links, or other distributable content. In one embodiment, the set-top box is an Internet Protocol television (IPTV) streaming device. The set-top box may display alerts to allow one or more users to stay current or follow certain topics, memes, themes, headlines, topics, teams, or specified information.

In one embodiment, the set-top box may be a stand-alone device connected to a television or other display. In other embodiments, the set-top box may be a networked device configured to communicate with a number of wired or wireless devices. The set-top box may be configured to connect to multiple computing or communications devices, such as routers, computers, gaming systems, smart phones, tablets, or enhanced accessories. For example, the set-top box may communicate with a number of devices utilizing wireless standards or protocols, such as Wi-Fi, Bluetooth, near field communications, WiMAX, or so forth. The set-top box may receive content through a cable, power line, satellite, phone line, Internet, or other communication connection. In one embodiment, the set-top box is a computing device providing two-way communications on an IP network and decoding the received video stream.

The media content may include information or extracted data that may be associated with the media content. For example, the extracted data may be determined utilizing closed captioning, embedded metadata, speech recognition, transcripts, software analysis, or so forth. The extracted data may be determined as streamed or in advance of streaming the media content. In one embodiment, the extracted data may be proactively managed and provided to the set-top box remotely by the communications service provider, media content provider, network station, media group, enterprise, advertiser, or other third party In another embodiment, the data may be extracted by the set-top box or another network device as received. The extracted data may also be determined by a number of network devices or set-top boxes that scan, analyze, or review content from a number of streams.

In one embodiment, one or more users may select alerts to receive from any of the media content being communicated to or displayed by a display in communication with the set-top box. As a result, alerts for each user may be customized and uniquely established based on the media content available or being viewed/streamed. The individual satisfaction with the viewing and interaction experience may be enhanced with greater user satisfaction and marketability of media services and programming. In one embodiment, programmers working with media content providers may configure media content to make it easier to receive updates or other alerts. The alerts may be generated based on user or alert preferences, criteria, settings, user profiles, keywords, phrases, channels, codes, event notifications, or other similar information. For example, the set-top box may determine which individual(s) are likely to be viewing the content based on the time, day of the week, history, trends, or user designation for customizing the alerts presented by the set-top box. In one embodiment, the user may set up an online profile or set-top box profile via an IR blaster that specifies the number of alerts, queuing or presentation of the alerts, steps taken (e.g. power on television, turn volume to a particular setting, etc.), presentation format, alert format, or so forth.

The extracted data may also be presented to designated wired or wireless devices in communication with the set-top box based on registration or alert preferences. In one embodiment, the display may be powered on utilizing the set-top box or a separate smart device or adapter configured to communicate with or power the display.

Figure 1:
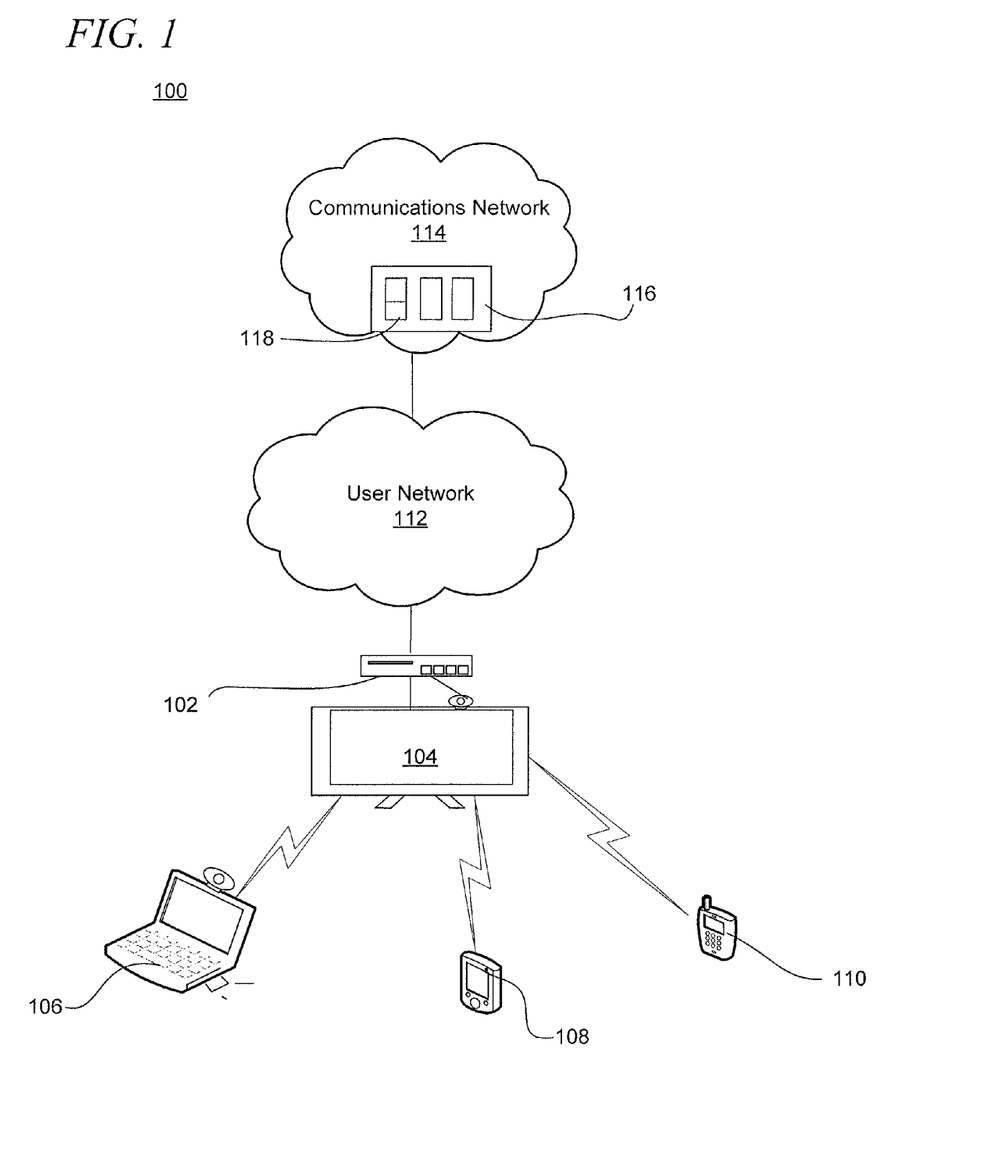
FIG. 1 is a pictorial representation of a communications environment in accordance with an illustrative embodiment.

FIG. 1 is a pictorial representation of a communications environment 100 in accordance with an illustrative embodiment. The different components, systems, devices, and equipment of the communications environment 100 may be configured to communicate and distribute media content to a number of electronic devices as selected by one or more users. In one embodiment, the communications environment 100 may include a set-top box 102, a television 104, wireless devices 106, 108, and 110, a user network 112, a communications network 114, and a communications management system 116.

Communications within the communications environment 100 may occur on any number of networks which may include wireless networks, data or packet networks, cable networks, satellite networks, Internet protocol television (IPTV) networks, private networks, public networks, cloud networks, or other types of communications networks. The communications network 114 is infrastructure including systems, equipment, devices, and software for sending and receiving media content and signals according to one or more designated formats, standards, and protocols. The communications network 114 may represent a single communication service provider or multiple communications service providers. For example, the communications network 114 may represent a cloud network that may be updated and accessed from innumerable locations, points, devices, networks, and systems.

In one embodiment, the features, services, and processes of the illustrative embodiments may be implemented by one or more components of the communications environment 100 independently or as a networked implementation. The communications network 114 may include various fiber optics, cables, transmission towers, antennas, adapters, routers, servers, or other components for transmitting and receiving media, data, and voice communications to the user network 112. The media content may be communicated within the communications environment 100 as data, packets, or other types of analog and digital signals.

In one embodiment, the user network 112 represents the wired or wireless communications an devices operated by a user. Communications between the communications network 114 and the user network 112 may occur utilizing wireless communications, such as satellite connections, Wi-Fi, WiMAX, code division multiple access (CDMA), 3G, 4G, LTE, PCS, and/or hardwired connections, such as fiber optics, T1, cable, DSL, high speed trunks, and telephone lines.

In one embodiment, the communications management system 116 is one or more network devices utilized to enable, initiate, route, and manage media content and other communications between one or more networks, connections, or communications devices. The communications management system 116 may include one, or more devices networked to manage the communications network 114. For example, the communications management system 116 may include any number of servers, routers, switches, or advanced intelligent devices. The communications network 116 sends and receives the electronic signals through any number of transmission mediums. The communications network 114 and the communications management system 116 may include IPTV systems and software. The communications management system 116 may be a cloud network and management system including a number of localized servers, database, and network devices (i.e. a server farm) or distributed systems and devices.

The communications management system 116 may also be referred to as the headend. In one embodiment, the communications management system 116 may include an alert agent 118. The alert agent 118 may be digital logic, software, or other instructions controlled by the communications management system 116. For example, the alert agent 118 may scan channels, data, or streams available through the communications network 114 for information relevant to a user's alert profile that may be established by the set-top box 102. The alert agent 118 may scan all media content that is or will be communicated to any of the customers or other parties to determine relevance based on a number of alert profiles.

The communications management system 116 and alert agent 118 may scan metadata, closed captioning content, optical character recognition, pattern recognition, data mining, tagging and predictive analysis, social media (e.g. Facebook, Twitter, LinkedIn, etc.), machine vision, algorithms, or utilize voice recognition to retrieve data from the media content. In other embodiments, a combination of these systems, methods, and processes may be utilized for accuracy or efficiency. In one embodiment, more than one process may be utilized to extract data to determine relevance to alert profiles. For example, natural language processing may be combined with review of closed captioning (if available) to extract data to determine whether alerts are generated. The alert profiles for numerous users may be generated utilizing the set-top box 102 and then communicated to the alert agent 118.

In another embodiment, the alert agent 118 may be implemented in and by the set-top box. The alert agent 118 may communicate with the communications management system 116 to determine if when, and how alerts are generated for display to the television 104 or communication to one or more of the wireless devices 106-110.

The communications service provider may scan all available content to provide the alerts as a way to motivate the user to sign up for additional channels, stations, or content thereby increasing revenues and user satisfaction. For example, in response to receiving a number of text based responses from a noted channel that the user has not subscribed to, the user may request to add that channel to programming that is available to the user. In another embodiment, the alert agent 118 may only scan content available to the user based on the user's programming selections or associated communications or entertainment packages. Alerts may also be sent based on promotions or free trial periods, such as "free" channel weekends. Temporary access or alerts may be utilized as a constant or temporary marketing tool.

The communications network 114 may include any number of servers, databases, and other systems for delivering content to the wireless devices 106-110. The one embodiment, browsers or applications of the wireless devices 106-110 may be utilized to retrieve content through the set-top box 102. For example, a mobile application may allow the wireless devices 106-110 to interact with the set-top box 102 to receive the alerts. In another embodiment, the set-top box 102 and the wireless devices 106-110 may host distinct or communicating applications that may be configured to perform the methods herein described.

As previously described, the content available to the set-top box 102 may be temporarily increased in response to an alert. The temporary increase may be complimentary service to encourage the user to purchase the additional channel or an expanded service from the communications service providers or other providers working with the communications service providers. In one embodiment, the alerts may be displayed graphically, audibly, or textually by the set-top box 102. However, the alerts may be delivered from the set-top box 102 to the display or wireless devices 106-110 as text, email, or chat messages, pop-ups, windows, alerts, webpages, or other graphical, audio, or tactile communications to the users.

In one embodiment, the set-top box 102 is configured to establish a server client relationship with each of the wireless devices 106-110. A server/client relationship may be established between the set-top box 102 and the wireless devices 106-110 for communications and management purposes and to synchronize alerts, alert profiles, and available content. The set-top box 102 may also function as a media server and enhanced IPTV alert gateway for each of the wireless devices 106-110. For example, the set-top box 102 may provide alerts to the wireless devices 106-110 based on alert profiles established on each of the wireless devices 106-110.

In one embodiment, each of the wireless devices 106-110 may be associated with the set-top box 102. For example, identifiers of each of the wireless devices 106-110 may be registered, linked, or associated with the set-top box 102. For example, an IMEI, Mac address, phone number, email address, username, or so forth may be registered with the set-top box 102. The set-top box 102 may communicate on one or more channels or networks designated for communication with the wireless devices 106-110. As a result, the wireless devices 106-110 may be automatically associated with the set-top box 102 in response to setting up wireless communications with the set-top box 102 (e.g. setting an SSID, username, device identification, key exchange, etc.) In one embodiment, the set-top box 102 may act as a repeater, extender, booster, or router.

The set-top box 102 may communicate with wireless devices 106-110 utilizing any number of wired or wireless standards or protocols. For example, the set-top box 102 may communicate with the wireless devices 106-110 utilizing Wi-Fi, Bluetooth, a cellular data signals (e.g. TDMA, CDMA, GSM, PCS, WLAN, GSMR, etc.) save it to sleep, near field communications, WiMAX, or other similar or developing standards. The number of wireless devices 106-110 may vary between one and ten devices at any given time. However, any number of devices may communicate with the set-top box 102 at once without limitation.

In one embodiment, the set-top box 102 may include logic configured to implement the processes as are herein described. For example, the logic may include the alert agent herein described. The logic may include motherboards, chipsets, ASICs, FPGAs, or other digital logic. In another embodiment, the logic may include algorithms, programs, scripts, applications, kernels, or other software instructions suitable for implementing the processes as described. The set-top box 102 may be configured to partition the display of the television 104 for the alerts as well as other alerts or content that may be selected from each of the wireless devices 106-110.

In one embodiment, the set-top box 102 may duplicate or share the alerts being streamed to the television 104 for each of the wireless devices 106-110. Any number of compression schemes or communications standards and protocols may be utilized within the communications environment 100 to ensure compatibility.

In one embodiment, the set-top box may include a master alert profile that is utilized to share alerts with each of the wireless devices 106-110. The user may select portions of the television display or a user interface in which to display the alerts in the alert profile. For example, the alert may be received as a text banner, pop-up message, chyron, segmented graphic, audio message (e.g. the media content may be paused or silenced to play the message), or so forth. In one embodiment, the alerts may include links to additional information (e.g. hyperlinks, embedded content, etc.).

User selections or input for the alerts may also be received through text input through a remote control and user interface presented by the set-top box 102, the wireless devices 106-110, or voice commands and relate to the types of alerts.

For example, the voice commands may be received through the individual wireless devices 106-110 or through the television 104, set-top box 102, or other integrated devices, such as webcams, microphones, gaming systems, controllers, remote controls, or so forth.

In one embodiment, the set-top box 102 may display the alerts as they change during the broadcast of media content. Additional content associated with the alerts may be selected utilizing buttons, icons, images, text, links, or other selection elements related to the alert and/or media content communicated to the set-top box 102. As a result, the communications environment 100 provides the opportunity for the user to customize their viewing an alert experience based on the criteria or triggers associated with their respective alert profile.

For example, users interested in sporting events may select to retrieve alerts regarding their favorite sport team. Users interested in politics may configure their alert profile to receive alerts based on the provider, individual speaking, keywords or phrases, or alert levels associated with an event. Similarly users interested in any number of topics or ideas (e.g. cooking, television personalities, political events, Senators, religious groups, astronomical happenings, products, technology developments, stock prices, companies or organizations, etc.) may configure the set-top box 102 to generate alerts. In one embodiment, the alerts may be queued for when the set-top box or television 104 is turned on. In another embodiment, the set-top box 102 may be configured to turn on the television for alerts. The alert profile may also allow the user to set a volume associated with the alerts.

In one embodiment, the alerts may be communicated directly from the set-top box 102 and the corresponding data connection to the wireless devices 106-110. As a result, wireless or alert costs for each of the wireless devices 106-110 may be reduced significantly. For example, bandwidth usage for a communication service provider associated with the wireless device 108 may be reduced by utilizing a Wi-Fi connection with the set-top box 102 to receive alerts. Alerts may also be delivered from a centralized server and sent to the set-top box 102 or mobile clients.

The alerts may be communicated as well as relevant data extracted from the media content or stream. All or a portion of the extracted data may be displayed to the user based on the length, relevance, or alert profile. In one embodiment, the alerts may be saved based on alert criteria and archived for subsequent review or searching. The user of the set-top box 102 may save alerts and associated content or move them from folder to folder, external devices, or to cloud storage (as permitted by applicable copyright and digital rights laws). In another embodiment, transcripts of the alerts or the associated closed captioning content may be made available so that follow-up searches or sub searches may be conducted on the recorded content. For example, as a user reviews a folder, collection, or queue of Chicago Bear alerts on the DVR, the user may utilize a sub search to search for alerts and associated content that are from the year 2018 and include the word "won" in them.

In one embodiment, recorded alerts and content may be segmented based on social media responses or applications that are utilized within or separate from the set-top box 102. For example, the alerts may be organized based on social network volume, such as Twitter volume that included the keywords during the time of broadcast. For example, users may be able to see the Orlando Magic alerts they were broadcast through IPTV, such as an ESPN channel, when a certain number of tweets about the magic were posted on Twitter. Similarly alerts and content recorded when social media volume was low for the associated keywords or alert criteria may not be as exciting or interesting and disregarded for the user. A special voting application implemented through the set-top box 102 may be able to rank programming and alerts based on most liked or disliked (e.g. like, dislike, stars, or rating input may be received). The alerts may then be organized or prioritized according to the alerts that are most likely to be relevant to the user based on historical views or views of the user's friends. In one embodiment, alerts may also be organized by the channel, date, transcript, viewed/never viewed, length of recording, associated location (e.g. state or city mentioned in the original content), local content, national content, or so forth. The alert preferences may allow the user to set an option to include content in commercials or exclude content in commercials. The alert content captured while the user is viewing one or more of the set-top boxes may also be marked to indicate it was captured during viewing. In one embodiment, the DVR features of the set-top box 102 may be configured to record content being displayed so that five minutes of content before or after the alert was triggered is available.

Figure 2:
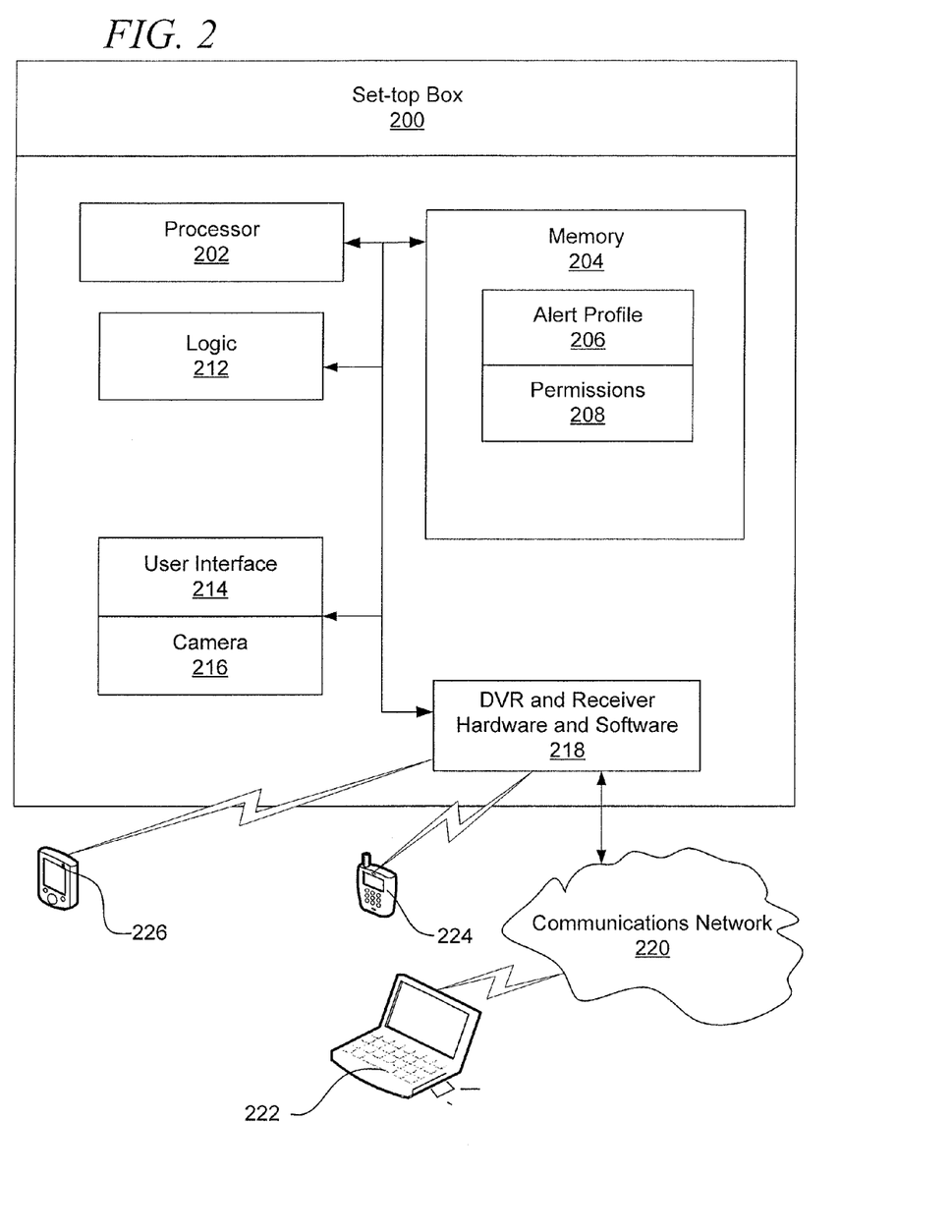
FIG. 2 is a block diagram of a set-top box in accordance with an illustrative embodiment.

FIG. 2 is a block diagram of a set-top box in accordance with an illustrative embodiment. In one embodiment, the set-top box 200 may include a processor 202, memory 204, alert profile 206, permissions 208, logic 212, user interface 214, camera 216, and DVR and receiver hardware and software 220. The set-top box 200 may communicate with communications network 220, and wireless devices 222, 224, and 226.

The processor 202 is circuitry or logic enabled to control execution of a set of instructions, application, operating system, kernel, or program. The processor 202 may be a microprocessor, digital signal processor, central processing unit, or other device suitable for controlling an electronic device including one or more hardware and software elements, executing software, instructions, programs, and applications, converting and processing signals and information, and performing other related tasks. The processor 202 may be a single chip (e.g. ASIC, FPGA, microprocessor, etc.) or integrated with other computing or communications elements.

The memory 204 is a hardware element, device, or recording media configured to store data for subsequent retrieval or access at a later time. The memory 204 may be static or dynamic memory 204. The memory 204 may include a hard disk, random access memory, cache, removable media drive, mass storage, or configuration suitable as storage for data, instructions, and information. In one embodiment, the memory 204 and processor 202 may be integrated. The memory 204 may use any type of volatile or non-volatile storage techniques and mediums.

In one embodiment, the memory 204 may store the alerts. The memory 204 may also store hyperlinks or other references associated with the alerts that are accessible by communications received by the set-top box 200. For example, the memory 204 may queue received alerts throughout the day for review by the user at night. In one embodiment, the alerts may be utilized to record media content from which the alert was derived in the memory 204 or the DVR and receiver hardware and software 218. In one embodiment, the memory 204 is integrated with the DVR and receiver hardware and software 220. The memory 204 may be partitioned for utilization by the DVR and receiver hardware and software 220 as well as other components of the set-top box 200. The set-top box 200 may include any number of computing and telecommunications components not specifically described herein for purposes of simplicity, such devices or elements may include busses, motherboards, circuits, ports, interfaces, cards, converters, adapters, connections, transceivers, displays, antennas, and other similar components.

In one embodiment, the logic 212 may represent the hardware, software, firmware, or combination thereof for implementing the processes herein described. For example, the logic 212 may represent programmable and updatable logic configured to manage and communicate alerts. In one embodiment, the alert profile 206 and the permissions 208 may be an integrated portion of the logic 212. The logic 212 may provide the instructions, criteria, parameters, and instructions for controlling the alert compilation, storage, management, generation, and communication.

In one embodiment, the alert profile 206 includes settings, criteria, and parameters for controlling the media, alert, and communications features of the set-top box 200. The alert profile 206 may be included in a larger user profile or user preferences for the set-top box. In one embodiment, the alert profile may control registering devices/user to receive alerts based on feedback and selections by a user. In one embodiment, the alert profile 206 may store a number of different user profiles associated with a number of users or the wireless devices 224, 226, and 228. The alert profile 206 may store hardware identifiers, software identifiers, nicknames, contact lists, preferred social networking sites and access information including usernames and passwords, and other similar details, information and settings. As a result, the set-top box 200 may identify which user or users are utilizing the set-top box 200 before displaying the alerts. Identification may be performed in response to the user logging in or an affirmative selection, imaging performed utilizing a camera or image capture system of the set-top box 200 ore connected system, historical use patterns, or other identifiers. In one embodiment, the alerts may include sensitive, graphic, or potentially explicit content and as a result the alerts may be displayed to the user only in response to receiving an authorization to display the alert and any content associated with the alert. For example, war news that the user has selected to receive in the alert profile 206 may include graphic images that the user may only want displayed if her children are not in the room.

In one embodiment, the permissions 208 are the parameters that locally govern the management and utilization of alerts. For example, the permissions 208 may establish types of content, rating preferences established for alerts distributed through the set-top box 200, as well as other allowed or prohibited content. In one embodiment, a number of users may utilize the set-top box 200 and as a result the permissions 208 may set limits and parameters that locally govern utilization of the set-top box 200. For example, the permissions 208 may establish rating levels associated with media content that users of the set-top box 200 may store and communicate to the wireless devices 224, 226, and 228. The permissions 208 may also set times of day that the alerts may be shared, such as between 8:00 a.m. and 8:00 p.m. The alerts may be saved in the memory 204 for delivery according to the alert profile 206 and permissions 208.

The user interface 214 is an audio, visual, or tactile interface for displaying images, data, text, and information to a user. The user interface 214 may generate a graphical user interface for communication to one or more interconnected displays or the wireless devices 224, 226, and 228. The user interface 214 may also be any number of buttons, scroll wheels, screens, touch interfaces, or other elements for receiving and outputting information to a user. In one embodiment, the user interface 214 may provide an interface for receiving input from a remote control, such as a Bluetooth or infrared remote control. For example, the user interface 214 may be utilized to customize the alert profile 206, set permissions 208 and indicate which of a number of potential users is currently accessing the set-top box. The user interface 214 may also include a keyboard, a touch screen, a Braille interface, speakers, a microphone, and other similar input and output devices. The wireless devices 224, 226, and 228 may also interact directly with the user interface 214 for receiving input and alerts, and displaying information.

The camera 216 is an image capture device. The images may include still and video images that may be retrieved and stored in the memory 204 or communicated directly to one or more other users. In one embodiment, the camera 216 may be integrated with the set-top box 200. In another embodiment, the camera may be externally linked utilizing any number of wireless or wired connections, such as a high definition media interface (HDMI), USB, Bluetooth, or Wi-Fi connection. In one embodiment, the camera 216 may utilize facial recognition or image analysis to determine the users in the room. Similarly, voice recognition may be utilized to determine the identity and presence of the users. The camera 216 may also be representative of the cameras of the wireless devices 224, 226, and 228 that may transmit content to the set-top box 200.

The digital video recorder and receiver hardware and software 220 are the hardware and software elements that allow the set-top box to function as a DVR and as a receiver. In one embodiment, the DVR and receiver hardware and software 220 may include logical elements for converting signals into media content and alerts that may be displayed to the television or other display. The DVR and receiver hardware and software 220 may also incorporate network interface elements for communicating with the communications network 222 which may include a satellite, cable, DSL, IPTV, or other networks. For example, the incoming content may be decoded and reformatted for display on a high-definition television or on the wireless devices 224, 226, and 228. For example, the DVR and receiver hardware and software 220 may format the satellite signals for display to the user and similarly, may function to display a message icon at the same time the standard content is displayed to the user.

Figure 3:
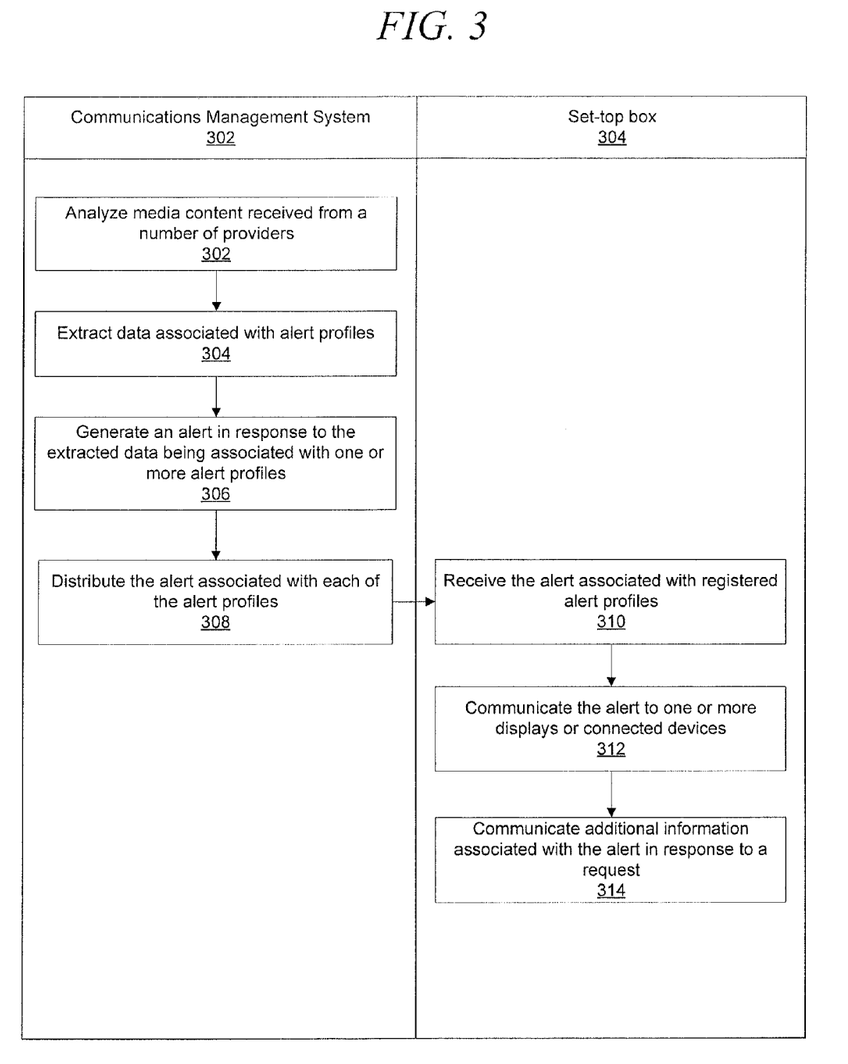
FIG. 3 is a flowchart of a process for communicating alerts through a set-top box in accordance with an illustrative embodiment.

FIG. 3 is a flowchart of a process for communicating alerts through a set-top box in accordance with an illustrative embodiment. In one embodiment, the process may be implemented by a communications management system 302 and a set-top box 304 as is herein described. In another embodiments, the process may be implemented entirely by the set-top box 304 and communicate with one or more electronic devices. The set-top box 302 may be configured to receive alerts from the communications management system 304. The alerts may then be communicated or displayed by one or more televisions, displays, or connected wireless devices. The set-top box 302 may have a hard wired or wireless connection to a network connection through one or more networks, connections, devices, or systems. The process described in FIG. 3 may be interchangeably used, such that any of the steps may be performed by one or both of the communications management system 302 and the set-top box 304.

In one embodiment, the process may begin with the communications management system 302 analyzing media content retrieved from a number of providers (step 302). As previously mentioned, the media content may be analyzed in any number of ways. In one embodiment, the communications management system 302 may be managed by a communications service provider. In a first embodiment, all streams or content received by or communicated through or by the communications service provider may be analyzed. In another embodiment, only streams or content relevant to a user may be analyzed.

Next, the communications management system 302 extracts data associated with alert profiles (step 304). The alert profiles may have been previously generated by a number of users and associated with one or more set-top boxes. The data may be extracted utilizing the keywords, parameters, or criteria specified by the alert profiles. The extracted data may include all or a portion of the original media content. For example, the extracted data may be a segment within a media program or streaming session determined to be relevant based on the alert profile. The extracted data may be a segment between commercial breaks, 30 seconds before and after the keyword, text, or phrases associated with the alert profile are mentioned or other segmentation of the media content.

In another embodiment, the communications management system 302 may utilize the Society of Cable and Telecommunications Engineers (SCTE)-35 cue tones, I-frames in MPEG, manifests, or playlists to perform segmentation. For example, SCTE-35 may provide a system and method for inserting markers into a file so that content may be inserted at those markers. SCTE-35 may also provide for any number of digital program insertion, such as the alerts herein described (see also SCTE-67).

Next, the communications management system 302 generates an alert in response to the extracted data being associated with one or more alert profiles (step 306). The alert may be packaged as a text, audio, video or combination of content types. For example, text associated with a video message may be communicated as part of the alert. The alert may be addressed for delivery to a number of set-top boxes that have alert profiles that are associated with the extracted data. The alert or alerts may be addressed to one or more set-top box utilizing hardware or software identifiers, such as MAC addresses, IP addresses, user names, passwords, account numbers, nicknames, software keys, or so forth. The alert may also indicate the time it was extracted, the relevant provider, background information if known, segment length, and reasons why the alert was generated.

Next, the communications management system 302 distributes the alerts associated with each of the alert profiles (step 308). In one embodiment, the alerts are distributed as soon as the extracted data is associated with the alert profile. As a result, the alerts may be generated in real-time or approximate real time. The communications management system 302 may continuously distribute alerts 24 hours a day in response to determining that the alerts are associated with one or more alert profiles.

Next, the set-top box 304 receives the alert associated with registered alert profiles (step 310). One or more alert profiles may be associated with users/user profiles that utilize the set-top box 304. The alert may be received as packets, discrete messages, or in an ongoing stream. In one embodiment, the set-top box 304 may wake up the television. For example, the set-top box 304 may utilize a wired or wireless connection to a television to turn it on or off for an alert.

Next, the set-top box 304 communicates the alert to one or more displays or connected devices (step 312). During step 312, the set-top box 304 may format and output the alert in a format compatible with one or more displays, such as television, projectors, or monitors, and wireless and computing devices, such as cell phones, tablets, laptops, e-readers, and desktops. The alerts may be communicated through wired or wireless connections. In one embodiment, the set-top box 304 may temporarily pause streaming media while recording it for subsequent playback in response to communicating the alert. The alert preferences may specify how the alert is displayed to a television or wireless device registered with the set-top box 304 (e.g. entire screen, audio only, video only, partial screen, picture-in-picture, pop up, ticker, overlay, combined methods, etc.).

The set-top box 304 also communicates additional information associated with the alert in response to a request (step 314). In one embodiment, the request may be from a user utilizing the set-top box. The request may be a button, icon, or other selection, voice command, tactile input (e.g. accelerometer), gesture command, or so forth. For example, the user may utilize a remote control (e.g. infrared, Bluetooth, Wi-Fi, etc.) to select an alert to receive additional information. In one embodiment, the set-top box 304 may automatically save or store an entire program or portions of a media content associated with an alert, such as a sports segment of the nightly news that is referring to terms included in the user's alert profile.

In one embodiment, the alerts may be stored remotely for access by the set-top box 304. For example, the set-top box 304 may receive the alerts from one or more servers or databases of a communications service provider or an affiliated party. As a result, the bandwidth of the connection or service to the set-top box 304 may be preserved because only requested alerts is downloaded to the set-top box 304 for distribution. In one embodiment, if one of the wireless devices receives selected alerts, the alerts is stored in case any of the other wireless devices have similar alert profiles increasing communication speeds and reducing the bandwidth utilized by the set-top box 304. The alerts may be focused on the media content, advertisements, tickers, news information, infomercials, information or data related to all aspects of the media content, and other commercially created or user created content. In one embodiment, the set-top box 304 may distribute the alerts as they are streamed to the set-top box 304. In another embodiment, the set-top box 304 may ensure that all of the alerts is received and/or verified before communicating the alerts to the display or other devices. The alerts may include web pages, application information, text, data, messages, alerts, video, images, streaming content, hyperlinks, documents, files, or other communicable content.

Figure 4:
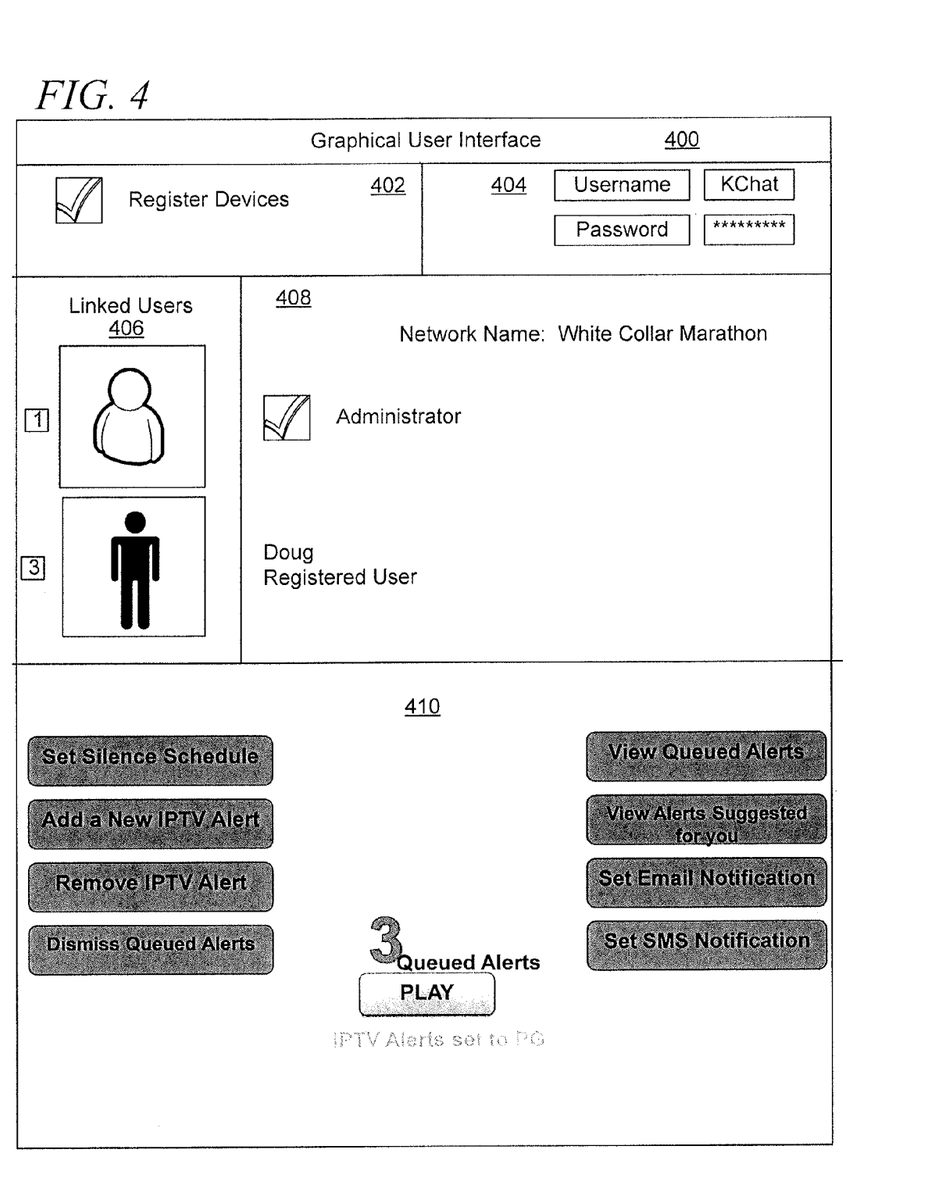
FIG. 4 is a pictorial representation of a graphical user interface displayed by the set-top box in accordance with an illustrative embodiment.

FIG. 4 is a pictorial representation of a graphical user interface 400 displayed by the set-top box in accordance with an illustrative embodiment. The graphical user interface 400 may be utilized to configure functionality of the set-top box. In one embodiment, the graphical user interface 400 may include any number of segments, partitions, windows, or display portions. For example, the graphical user interface 400 may include sections 402, 404, 406, 408, and 410. In one embodiment, the graphical user interface 400 may be displayed to an administrator, master user, or other user with permission or authorization to configure the set-top box.

Section 404 may be utilized to authenticate the user is authorized to make changes to the set-top box. For example, graphical user interface 404 may request a username, password, account number, nickname, pin, voice print, biometric, or other identifying information. Any number of encryption, security, or authorization schemes may also be utilized.

Sections 402 and 404 may allow a user to register devices that are configured to receive alerts communicated to or through the set-top box. The registered devices include any number of wired or wireless computing and communications devices.

In one embodiment, section 410 may be utilized to set one or more alert profiles associated with users and/or the set-top box. The graphical user interface 400 may display any number of interactive or visual windows, graphics, icons, text, video, images, drop down menus, or other selection components. For example, the user may select to set a silence schedule for the set-top box. The silence schedule indicates time period during which alerts may not be communicated to the connected television or other devices. In one embodiment, during the silence schedule or quiet times, any incoming alerts are queued for display at a later time. For example, the DVR may save the alerts for subsequent retrieval and display. The silence schedule may allow the user to specify time periods, such as hours of the day, days, or other information for the entire set-top box or based on applicable users.

The user may also select one of the visual components of section 410 to add a new IPTV alert. The user may be allowed to set up the properties, criteria, and settings of the alert profile. For example, the set-top box may be configured to automatically turn on the display via wired or wireless signals, IR adapter, or so forth, record the alert and associated media content, or a combination thereof. In creating an alert, the user may specify one or more of each of the following: keywords (e.g. Korea, Iran, Pittsburgh or Steelers, quarterback problem, cooking with charcoal, etc.), programming genres (e.g. movies, news, sports, entertainment), television channels (e.g. All, CNN, FOX, ESPN, etc.), alert volume (1-10), play live (Y/N), DVR (Y/N), Queue (Y/N), beginning date/time, and ending date/time, always on, specified times, or so forth.

The graphical user interface 400 may also provide selection components for editing or removing IPTV alerts. In one embodiment, the DVR of the set-top box may allow the user to record four or more alerts at the same time on different channels. Alerts profiles may be associated with different set-top boxes or displays based on the configuration of the set-top box system. For example, some set-top boxes have a master device that controls the others. The user may be able to specify which of a number of set-top boxes receive alerts from the master or controlling set-top box.

The graphical user interface 400 may also display suggested alerts for the user based on previous requests or media content selection. The suggested alerts may be based on the alerts set by other users with similar viewing habits. The alerts may also be based on the programs watched and common themes of user consumption. For example, the user may be presented with suggestions for "Chicago Bears" and "Home Prices" based on previous searches or past viewing history.

In one embodiment, the graphical user interface 400 may be part of a mobile application that is available to edit the alert profiles, add alerts, edit alerts, or delete alerts locally or remotely.

The previous detailed description is of a small number of embodiments for implementing the invention and is not intended to be limiting in scope. The following claims set forth a number of the embodiments of the invention disclosed with greater particularity.

What is claimed:

1. A method for distributing an alert to a set-top box, the method comprising:
   receiving media content for communication to one or more set-top boxes, each of the one or more set-top boxes associated with one or more alert profiles;
   determining whether the media content is relevant to the one or more alert profiles, wherein at least metadata related to the media content is analyzed;
   extracting data associated with the one or more alert profiles from the media content, wherein data is extracted based on criteria in the alert profiles, and wherein extracted data includes a segment of the media content itself as determined by the criteria;
   generating an alert in response to the extracted data being associated with the one or more alert profiles, wherein the alert is one of a plurality of alerts;
   distributing the alert to the one or more set-top boxes having respectively the one or more alert profiles, based at least in part on an association of the alert with at least one of the one or more alert profiles;
   presenting the alert if a threshold volume of social network activity is reached related to the media content, wherein the social network activity comprises at least one of social media postings, likes, dislikes, or social media commentary related to the media content;
   disregarding the alert if the threshold volume of social network activity is not reached related to the media content; and
   recording the plurality of alerts, wherein the recorded alerts are organized based on at least one of social network volume, length of recording, historical views, views of friends, or national content.

2. The method according to claim 1, further comprising: displaying the plurality of alerts to one or more devices in communication with the set-top box.

3. The method according to claim 1, further comprising: communicating information associated with the alert in response to a request.

4. The method according to claim 1, further comprising: turning on a display in communication with the set-top box to communicate the plurality of alerts in response to receiving the plurality of alerts.

5. The method according to claim 1, further comprising: displaying the plurality of alerts textually to a display in communication with the set-top box.

6. The method according to claim 1, further comprising: communicating the plurality of alerts audibly and visually to a display in communication with the set-top box.

7. The method according to claim 1, wherein the method of claim 1 is performed by a server utilized by a communications service provider communicating the media content through an Internet Protocol television signal.

8. The method according to claim 1, wherein the one or more set-top boxes are configured for Internet Protocol television streaming.

9. The method according to claim 1, wherein the extracting is performed utilizing closed captioning, metadata, or speech recognition.

10. The method according to claim 1, wherein the one or more alert profiles are received from users through a plurality of set-top boxes.

11. The method according to claim 1, wherein the one or more alert profiles specify keywords for generating the alert.

12. The method according to claim 1, wherein the one or more alert profiles specify a display configuration for the alert, a volume for the alert if utilized, programming genres or channels to search, and a time period for the alert.

13. The method according to claim 1, further comprising: recording all or a portion of the media content associated with the alert in response to the one or more alert profiles.

14. A set-top box, comprising:
   an interface for communication with a communications network;
   output ports for communicating media content to one or more displays;
   non-transitory computer readable media comprising logic configured to be executed by a processor to:
      receive alerts associated with extracted data received by the communications network; and
      record the alerts, wherein the recorded alerts are organized based on at least one of social network volume, length of recording, historical views, views of friends, or national content;
      wherein at least metadata related to the media content is analyzed to determine whether the media content is relevant to one or more alert profiles associated with the set-top box, wherein the extracted data is extracted based on criteria in the one or more alert profiles, wherein extracted data includes a segment of the media content itself as determined by the criteria, and wherein the alerts are distributed to the set top box, based at least in part on an association of the alert with at least one of the one or more alert profiles of the set top box;
      present the alert if a threshold volume of social network activity is reached related to the media content, wherein the social network activity comprises at least one of social media postings, likes, dislikes, or social media commentary related to the media content; and
      disregard the alert if the threshold volume of social network activity is not reached related to the media content; and
   a memory configured to store one or more alert profiles for one or more users.

15. The set-top box according to claim 14, wherein the logic is configured to be executed by the processor to record media content associated with the alerts to the memory.

16. The set-top box according to claim 14, wherein the logic is configured to be executed by the processor to display the alerts according to the one or more alert profiles.

17. The set-top box according to claim 14, wherein the logic is configured to be executed by the processor to distribute the alerts to one or more wireless devices in response to the one or more alert profiles.

18. The set-top box according to claim 14, wherein the logic is configured to be executed by the processor to communicate a signal to the one or more displays to be turned on in response to receiving the alerts.

19. The set-top box according to claim 14, wherein the logic is configured to be executed by the processor to receive the one or more alert profiles, and generate criteria for generating the alerts that are saved to the one or more alert profiles.

* * * * *